US007590786B2

(12) United States Patent
Seki et al.

(10) Patent No.: US 7,590,786 B2
(45) Date of Patent: Sep. 15, 2009

(54) SERVER SYSTEM AND SIGNAL PROCESSING UNIT, SERVER, AND CHASSIS THEREOF

(75) Inventors: Fujio Seki, Shinagawa (JP); Heiichi Sugino, Shinagawa (JP); Takeshi Kasai, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 199 days.

(21) Appl. No.: 10/986,138

(22) Filed: Nov. 12, 2004

(65) Prior Publication Data

US 2005/0105542 A1    May 19, 2005

(30) Foreign Application Priority Data

Nov. 14, 2003    (JP)    ............... 2003-385198

(51) Int. Cl.
*H05K 7/10*    (2006.01)
(52) U.S. Cl. ............. 710/302; 710/100; 702/188
(58) Field of Classification Search ......... 710/300–302, 710/100
See application file for complete search history.

(56) References Cited

U.S. PATENT DOCUMENTS

| | | | |
|---|---|---|---|
| 6,528,904 B1 | 3/2003 | Wong | |
| 6,823,283 B2 * | 11/2004 | Steger et al. | ................. 702/127 |
| 7,139,861 B2 * | 11/2006 | Lee | ............................. 710/316 |
| 7,146,447 B2 * | 12/2006 | Chari et al. | ................. 710/302 |
| 2002/0124128 A1 | 9/2002 | Qiu | |
| 2002/0143996 A1 | 10/2002 | Odryna et al. | |
| 2002/0188718 A1 * | 12/2002 | McGraw et al. | ............. 709/224 |
| 2003/0200345 A1 | 10/2003 | Ramsey et al. | |
| 2004/0033734 A1 * | 2/2004 | Lelong et al. | ............... 439/894 |
| 2005/0200714 A1 * | 9/2005 | Marchese | ................. 348/211.3 |

FOREIGN PATENT DOCUMENTS

JP    2001-344189    12/2001

OTHER PUBLICATIONS

European Search Report mailed Nov. 22, 2006 for Application No. EP 04 25 7033.

* cited by examiner

*Primary Examiner*—Clifford H Knoll
(74) *Attorney, Agent, or Firm*—Staas & Halsey LLP

(57) ABSTRACT

A server system includes at least one server, a signal processing unit that enables to operate said at least one server with a set of console, and a chassis having slots and a circuit board, said at least one server or the signal processing unit being attachable and detachable to any of the slots, the circuit board having interconnection lines connecting the slots. Said at least one server and the signal processing unit being connected via an interface that allows plug and play connectivity. Thus, it is possible to construct the server system without external cables. In addition, when a server is newly added to or removed from the system or, it is no longer necessary to power of the other servers. This makes it possible to facilitate system construction and management.

18 Claims, 13 Drawing Sheets

SERVER SYSTEM AND SIGNAL PROCESSING UNIT, SERVER, AND CHASSIS THEREOF

BACKGROUND OF THE INVENTION

1. Field of the Invention

This invention generally relates to a server system and a signal processing unit, a server, and a chassis thereof that enable to operate at least one server with a set of console.

2. Description of the Related Art

A conventional technique for directly accessing a server on a network by remote control has been proposed in Japanese Patent Application Publication No. 2001-344189. FIG. 1 shows an example of a remote control system with the use of the above-mentioned conventional technique.

The system architecture shown in FIG. 1 includes multiple groups of servers 910. Each group is composed of a chassis on which multiple servers 911 are mounted. The servers 911 are connected to a server switching unit 901 via connectors for outputting display images such as VGA (Video Graphics Array) connector, keyboard connector, mouse connector such as PS/2® connector, or the like.

The server switching unit 901 is connected to a network 903 such as a LAN (Local Area Network), the Internet, or the like. By way of the network 903, the server switching unit 901 is configured to communicate with an information processing device 920 such as a personal computer (hereinafter simply referred to as PC), a workstation, or the like.

More specifically, the server switching unit 901, upon request of the information processing device 920, selectively connects the information processing device 920 to the requested server 911. In the above-mentioned case, the server switching unit 901 generates, for example, an IP (Internet Protocol) packet based on a displayed image outputted from the VGA connector of the server 911, and sends the IP packet to the information processing device 920. The information processing device 920 receives the IP packet from the network 903 based on an IP address, and displays the image displayed on the server 911 on a monitor 921. The information processing device 920 also converts instructional information inputted with a keyboard or mouse in response to the above-mentioned displayed image into an IP packet, and sends the IP packet to the server switching unit 901. The server switching unit 901 receives the IP packet including the instructional information from the network 903 based on the IP address, extracts the instructional information, and outputs the instructional information to the keyboard connector or the mouse connector of the server 911.

The server switching unit 901 makes the information processing unit 920 serve as an input/output device for the monitor, keyboard, mouse or the like connected to a selected server 911. This allows the operator to operate the above-mentioned input/output device as if the input/output device were directly connected to the server 911.

Conventionally, the servers 911 are respectively connected to the network 903, in addition to being respectively connected to the server switching unit 901. That is, the servers 911 are equipped with network adapters.

Besides, with the above-mentioned architecture, additional cables are required for respectively connecting the servers 911 to the server switching unit 901 and for respectively connecting the servers 911 to the network 903. Therefore, more cables are required as the number of the servers 911 grows. Particularly, in recent years, the mainstream architecture of large-scale systems is that multiple servers 911 are mounted on a single chassis (the group of servers 910 shown in FIG. 1). With the above-mentioned architecture, it is to be noted that a large number of connecting cables are aggregated in one place, which causes troublesome situations to lay and manage the cables.

Further, in the case where a server 911 is newly added, it is necessary to power off all the other servers 911 mounted on the chassis to which the server 911 is newly added. Thus, there is the problem in that a system cannot flexibly be altered.

SUMMARY OF THE INVENTION

It is therefore an object of the present invention to provide a server system, a signal processing unit, a server, and a chassis thereof that enable to facilitate system construction, system alteration, and system management.

According to an aspect of the present invention, there is provided a server system including at least one server, a signal processing unit that enables to operate said at least one server with a set of console, and a chassis having slots and a circuit board, said at least one server or the signal processing unit being attachable and detachable to any of the slots, the circuit board having interconnection lines connecting the slots, said at least one server and the signal processing unit being connected via an interface that allows plug and play connectivity.

According to another aspect of the present invention, there is provided a signal processing unit including a first circuit having an interface that allows plug and play connectivity, and a second circuit connectable to a server system via the first circuit, the server system having slots that are provided to a chassis and are connected together via interconnection lines, a server being any of the slots.

According to yet another aspect of the present invention, there is provided a server including a connector that allows the server to be inserted into any of slots that are provided to a chassis of a server system and are mutually connected via interconnection lines, and an interface circuit connected to a signal processing unit that is inserted into one of the slots and has an interface that allows the server to be connected to the signal processing unit with plug and play connectivity.

According to further another aspect of the present invention, there is provided a chassis including a circuit board having slots into which servers can be inserted, and interconnection lines that are provided to the circuit board and connects the slots, the servers being connected, via the interconnection lines, to a signal processing unit having an interface that enables to operate the servers with a single set of console.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of embodiments of the present invention with reference to the accompanying drawings.

First Embodiment

Figure 1:
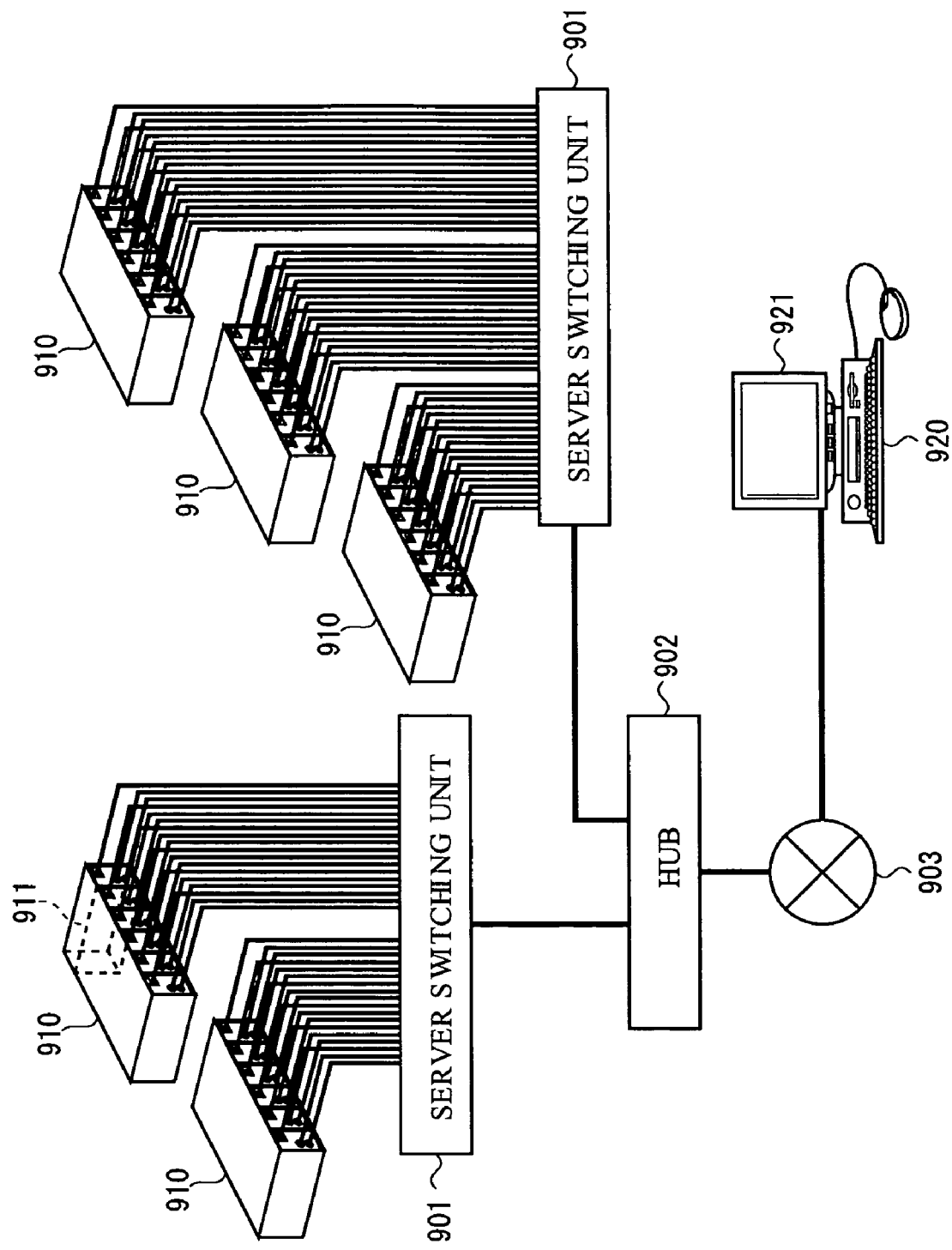
FIG. 1 shows an example of a remote control system with the use of a conventional technique.
Figure 2:
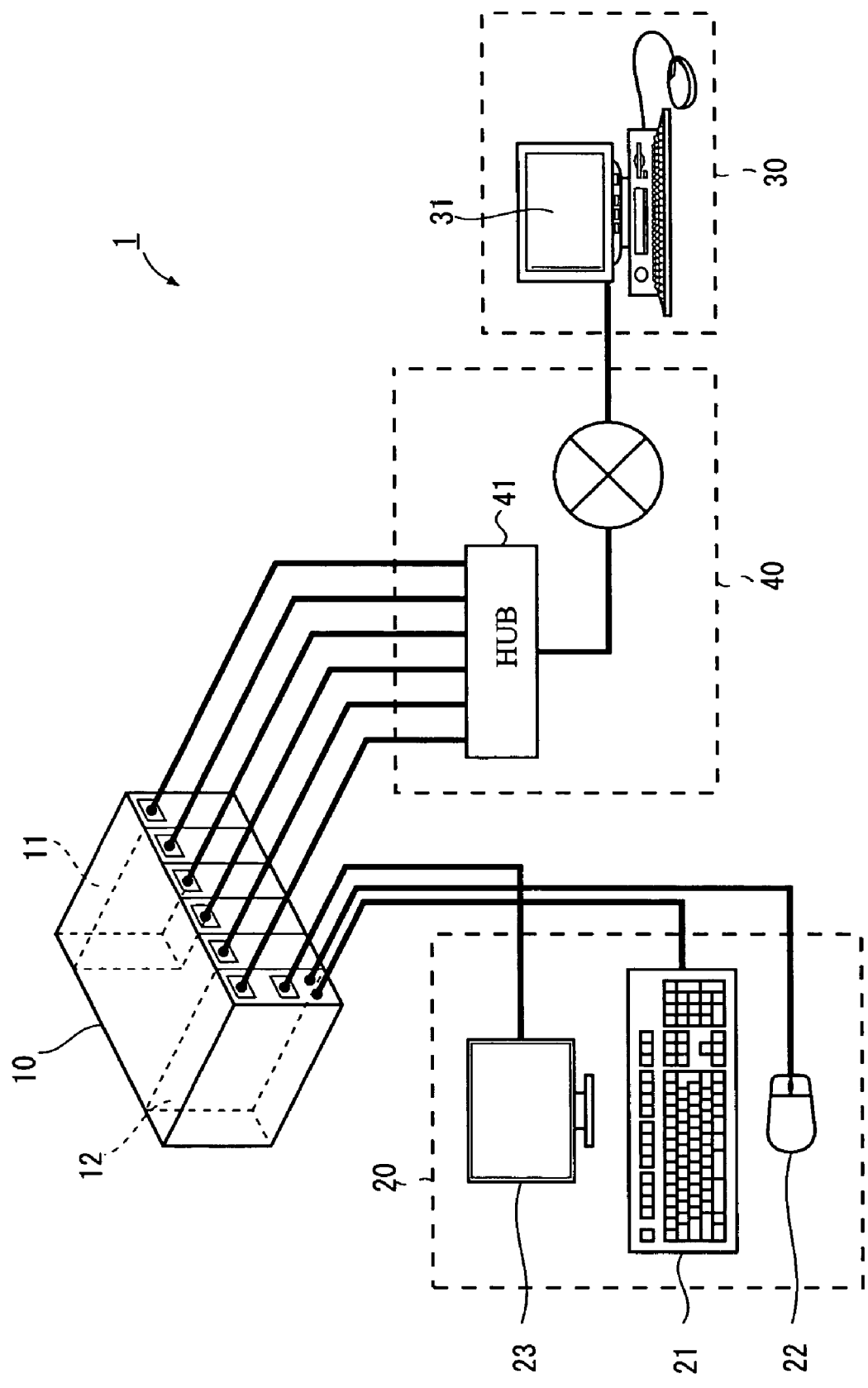
FIG. 2 shows architecture of a server system 1 in accordance with a first embodiment of the present invention.

A first embodiment of the present invention will be first described in detail, with reference to the accompanying drawings. FIG. 2 shows architecture of a server system 1.

Referring to FIG. 2, the server system 1 includes at least one blade chassis 10 having at least one blade server 11. The blade server 11 includes a network adapter, as will be described later in detail, and a jack on the front side or back side thereof so that a LAN cable or the like may be connected to. The blade server 11 is connected to a LAN 40 via the above-mentioned LAN cable. However, not limited to the LAN 40, the blade server 11 may be connected to various types of networks such as a WAN (Wide Area Network) or the Internet.

The LAN 40 includes, for example, a HUB 41 that serves as a relay node. The HUB 41 propagates IP packets that are communicated among connected servers and clients. A PC 30 is connected to the LAN 40 as a client terminal, in accordance with the first embodiment of the present invention.

The blade chassis 10, which will be described later in detail, includes slots 105 and 106, into which the blade server 11 and a KVM (Keyboard-Video-Mouse) device 12 may be respectively inserted. The blade chassis 10 also includes a circuit board (a backplane 107) having interconnection lines 108 that respectively connect the blade servers 11 and the KVM device 12. As described above, the KVM device 12 may be inserted into and removed from the blade chassis 10 on which the blade servers 11 are mounted. Therefore, the interconnection lines 108, which connect the blade servers 11 and the KVM device 12, may also be mounted on the blade chassis 10. This makes it possible to readily connect the blade servers 11 and the KVM device 12 without an external cable or the like.

The KVM device 12 is a signal processing unit that connects an input/output device and a display device to any one of the blade servers 11. The input/output device denotes a keyboard or a mouse. The display device denotes a monitor. The KVM device 12, as will be described later in detail, is connected to at least one blade server 11 via a backplane 107 on the blade chassis 10. The KVM 12 is capable of locally connecting a local KVM 20 having a keyboard 21, a mouse 22, and a monitor 23. "K" for KVM denotes keyboard, "V" denotes monitor, and "M" denotes mouse. The local KVM 20 is a set of console that is used for operating the blade servers 11.

The basic operation of the KVM device 12 will be described. The KVM device 12 inputs data applied from the keyboard 21 or the mouse 22, into the blade server 11. The data includes, for example, a keyboard signal (hereinafter simply referred to as K signal) or a mouse signal (hereinafter simply referred to as M signal). The K signal is generated by the keyboard 21 based on a user's manipulation. The M signal is generated by the mouse 22 based on the user's manipulation. Also, the KVM device 12 applies data that is outputted from the blade server 11 to the keyboard 21, the mouse 22, or the monitor 23. The data includes a command that the blade server 11 gives instructions to the keyboard 21 or the mouse 22 and a video signal (hereinafter simply referred to as V signal) that the blade server 11 displays on an output screen such as a console screen or a GUI (graphical User Interface) screen.

The KVM device 12 controls input and output of various types of data based on the request from a user. The KVM device 12 inputs the data from the keyboard 21 or the mouse 22 into any one of the blade servers 11 that is selected by the user. Also, the KVM device 12 inputs the data from any one of the blade servers 11 that the user selects, into the keyboard 21, the mouse 22, or the monitor 23. Thus, with the KVM 12, it is possible to realize a computing environment as if the keyboard 21, the mouse 22, and the monitor 23 were directly connecting to the selected blade server 11.

In addition to the above-mentioned configuration, another KVM device that is provided with the PC 30 to manipulate the blade server 11 as a set of console, in accordance with the first embodiment of the present invention. That is, the user is able to operate the blade server 11 with the PC 30, in accordance with the first embodiment of the present invention. In order to achieve this, the KVM device 12 is equipped with a network adapter, as will be described later in detail, and a jack on the front or back side thereof so as to connect a LAN cable or the like. With the KVM device 12, it is also possible to realize another computing environment that the selected blade server 11 may be operated with the PC 30 by sending and receiving data to and from the PC 30 via the LAN 40.

A description will be given of the blade chassis 10, the blade server 11, and the KVM device 12 in accordance with the first embodiment, with reference to the accompanying drawings.

Figure 3:
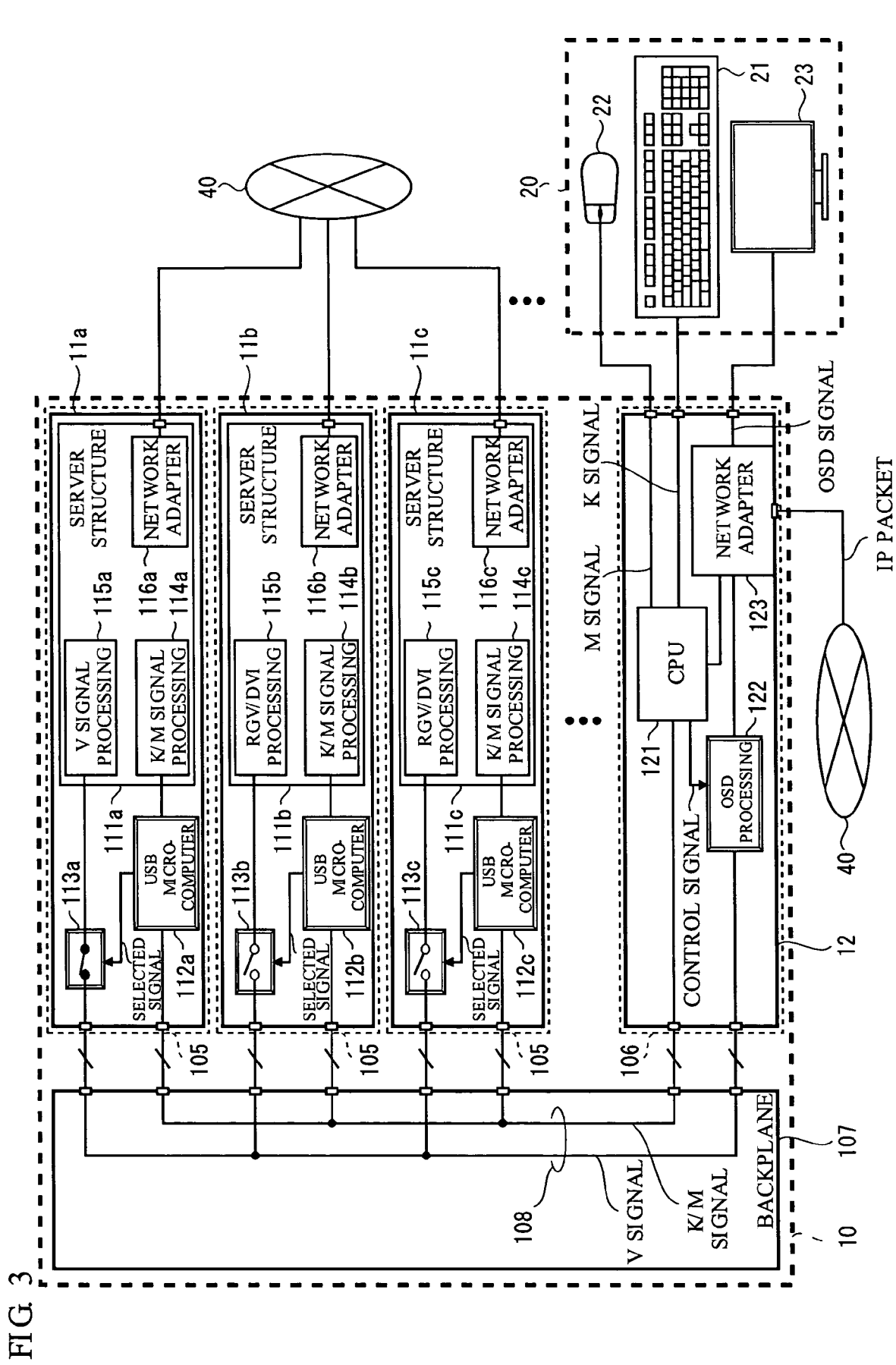
FIG. 3 is a block diagram showing structures of a blade chassis 10, a blade server 11, and a KVM device 12 in accordance with the first embodiment of the present invention.

FIG. 3 is a block diagram showing structures of the blade chassis 10, the blade server 11, and the KVM device 12. In the description below, the blade chassis 10 includes three blade servers, 11a, 11b, and 11c.

The blade server 11a includes a circuit board on which a server structure 111a, a USB (Universal Serial Bus) microcomputer 112a, a switch (SW) 113a are mounted. The server structure 111a, the USB microcomputer 112a, and the switch 113a are interconnected via a bus provided on the circuit board. Other blade servers 11b and 11c have the same configurations. Therefore, the blade server 11a will be described below.

First, a description will be given of the server structure 111a. The server structure 111a includes a K/M signal processing unit 114a, a V signal processing unit 115a, and a network adapter 116a, in addition to a CPU (Central Processing Unit), a memory, and a hard disc. Aforementioned components are included in a general server.

The network adapter 116a is used for connecting the server structure 111a independently to the LAN 40. The network adapter 116a is equipped with a jack into which a LAN cable is plugged.

The K/M signal processing unit 114a processes inputted K signal or M signal as instructional information from the user, and outputs the instructional information into the CPU in the server structure 111a. The K signal or the M signal (hereinafter referred to as K/M signal) is inputted into the K/M signal processing unit 114a from the KVM device 12 via the USB microcomputer 112a.

The K/M signal processing unit 114a outputs a command for setting up the keyboard or mouse. This command may be generated by the K/M signal processing unit 114a or another component of the server structure 111a such as the CPU 121. The command outputted from the K/M signal processing unit 114a is inputted into the KVM device 12 via the USB microcomputer 112a. The KVM device 12 outputs the inputted command into the keyboard or mouse as necessary, or sends the command to the PC 30 that is connected via the LAN 40.

The V signal processing unit 115a outputs an output screen of the blade server 11a as a V signal of RGB (Red/Green/Blue) method or DVI (Digital Visual Interface) method. The RGB method may employ analogue or digital method. The RGB method will be described below. The V signal processing unit 115a outputs both horizontal and vertical synchronizing signals. Therefore, in the description below, the above-mentioned signals will be included in the V signal. The V signal outputted from the V signal processing unit 115a is applied to the KVM device 12 via the switch 113a. The KVM device 12 generates an image of the output screen, based on the applied V signal, and displays the image as necessary or as required or sends to the PC 30 connected via the LAN 40. This image is displayed on the monitor 23 or a monitor 31 as OSD (On Screen Display).

Next, a description will be given of other components. The USB microcomputer 112a incorporates a USB interface circuit that allows plug and play connectivity, and controls an interface that connects the blade server 11a and the KVM device 12. The blade server 11a and the KVM device 12 are thus connected with the interface that enables plug and play connectivity such as the above-mentioned USB interface. Therefore, it is no longer necessary to power off other blade servers, the KVM device 12, or the blade chassis 10 when the blade server 11a is inserted or removed. In addition, the interface that allows plug and play connectivity is readily able to control the situation when the blade server 11 is newly activated. Further, it is possible to switch from any one of the blade servers 11 to another one immediately, by employing the interface that allows plug and play connectivity. The USB microcomputer 112a may be replaced by another microcomputer that incorporates another bus interface circuit, if the interface enables plug and play connectivity.

The USB microcomputer 112a inputs the K/M signal into the K/M signal processing unit 114a as necessary. The K/M signal is applied from the KVM device 12. In addition, the USB microcomputer 112a applies the command that is inputted from the K/M signal processing unit 114a into the KVM device 12 as necessary or as required. Therefore, the respective blade servers are required to include the USB microcomputers 112a, 112b, 112c and so forth, on a one-to-one basis.

Further, the USB microcomputer 112a controls the switch 113a by turning on and off, based upon the control from the CPU 121. The switch 113a is configured to enable or disenable the output of the V signal and selectively pass the V signal applied from a specific blade server 11. Thus, the switch 113a may be composed of a simple on/off switch. The USB microcomputer 112a selectively changes the status of the selected signal, High or Low, which is to be applied to a control terminal of the switch 113a. In the description below, in the case where the selected signal is High, the switch 113a turns on and passes the V signal applied from the V signal processing unit 115a. In the case where the selected signal is Low, the switch 113a turns off and interrupts the V signal.

The above-mentioned blade servers 11a, 11b, and 11c are inserted into the slots 105 that are provided on the blade chassis 10. The blade chassis 10 includes a backplane 107. The backplane 107 is equipped with signal lines, which are the interconnection lines 108 to connect the respective blade servers 11. The backplane 107 is also equipped with a power supply line for providing the respective blade servers 11 and the KVM device 12 with a power supply circuit and power. The backplane 107 is also provided with sockets into which connectors of the blade servers 11a, 11b, and 11c are plugged when the blade servers 11a, 11b, and 11c are inserted into the blade chassis 10. Card edge connectors, for example, may be employed for the connectors on the blade servers 11a, 11b, and 11c.

The USB microcomputer 11a and the switch 113a are connected to the interconnection lines 108, by inserting the blade server 11a into the blade chassis 10. Other bus or power supply lines are also connected to given lines of the backplane 107. The interconnection lines 108 are composed of two lines for USB connection and five lines for RGB connection. The lines are respectively branched and connected to the sockets provided on the slots 105 of the blade chassis 10.

The KVM device 12 includes a CPU 121, an OSD processing unit 122, and a network adapter 123 mounted on a single circuit board. The CPU 121, the OSD processing unit 122, and the network adapter 123 are interconnected via the bus provided on the circuit board.

The KVM device 12 having the above-mentioned structure is inserted into the slot 106 provided on the blade chassis 10. The slot 106 may have the same shape as those of the slots 105 for the blade servers 11a, 11b, and 11c. That is, the KVM device 12 may be produced with the same circuit board as that of the blade server 10. When the KVM device 12 is inserted into the slot 106, the connectors of the KVM device 12 are plugged into the sockets of the backplane 107. This is same as the case where the blade servers 11a, 11b, and 11c are inserted into the slots 105. Thus, the CPU 121 and the OSD processing unit 122 are connected together on the interconnection lines 108. The KVM device 12 may be inserted into any slot, if the connector of the KVM device 12 is designed to have the same shape as those of the blade servers 11a, 11b, and 11c.

The CPU 121 is connected to the USB microcomputers 112a, 112b, and 112c of the respective blade servers via the interconnection lines 108 to input and output the K/M signal and the commands into the USB microcomputers 112a, 112b, and 112c. The CPU 121 outputs the K/M signal applied from the local KVM 20 into the USB microcomputer of the blade server that is selected by the user. In the description below, the blade server 11a is selected. In addition, the CPU 121 inputs the command applied from the selected blade server 11a to the keyboard 21 or the mouse 22. Further, the CPU 121 temporarily saves the command applied from unselected blade servers in a given memory such as a cache memory. Here, the unselected blade servers are the blade servers 11b and 11c. When any one of the blade servers 11b or 11c is selected, the temporarily saved command is applied to the keyboard 21 or the mouse 22. The CPU 121 may be connected to the keyboard 21 and the mouse 22 via the USB or another interface such as PS/2 or the like.

The CPU 121 turns on the switch 113a, by controlling the USB microcomputer 112a of the selected blade server 11a. Simultaneously, the CPU 121 turns off the switches 113b and 113c, by controlling the USB microcomputers 112b and 112c of the selected blade servers 11b and 11c. That is to say, the CPU 121 controls the USB microcomputers 113a, 113b, and 113c so that the V signal is applied from only the selected blade server 11a.

Further, if any one of the blade servers is not selected, the CPU 121 stops the operation of the OSD processing unit 122, by setting the control signal to Low, for example. The Low control signal turns off the OSD processing unit 122, and disconnects the signals to the network adapter 123. In contrast, if any one of the blade servers is selected, the CPU 121 starts the operation of the OSD processing unit 122, by setting the control signal to High, for example. The High control signal turns on the OSD processing unit 122, and applies an OSD signal or the like to the network adapter 123. The OSD signal will be described later in detail.

Here, the operation of the OSD processing unit 122 will be described. The OSD processing unit 122 generates an image of the output screen to be displayed on the monitor 23, based on the applied V signal. This image is generated as image data in bitmap format, GIF (Graphical Interchange Format) format, JPEG (Joint Photographic Experts Group) format, or the like.

In the case where the local KVM 20 is operated, the OSD processing unit 122 generates the OSD signal from the generated image, and applies the OSD signal to the network adapter 123. The network adapter 123 outputs the applied OSD signal into the monitor 23. The network adapter 123 and the monitor 23 may be connected via an interface for connecting a display such as RGB cable or DVI method. Another type of interface such as RS-232c may be employed.

In the case where the PC 30 is operated, the OSD processing unit 122 applies the generated image to the network adapter 123 without change. The network adapter 123 generates an IP packet based on the applied image, and sends the IP packet to the PC 30 via the LAN 40. The PC 30 displays the image that is obtained from the received IP packet, in a pop-up window on the monitor 31.

In the case where the blade server is operated with the local KVM 20, the user operates the keyboard 21 in a given manner. Thus generated K signal is applied to the CPU 121. The CPU 121 detects the applied K signal and determines that the local KVM 20 has been operated. In contrast, in the case where the blade server is operated with the PC 30, the user accesses the KVM device 12, based on an IP address assigned to the network adapter 123 of the KVM device 12, and inputs a given command. The inputted given command is applied to the CPU 121. The CPU 121 determines that the PC 30 has been operated, with the applied given command.

Next, a description will be given of the operation of the server system 1 with the accompanying drawings, in accordance with the first embodiment of the present invention.

Figure 4:
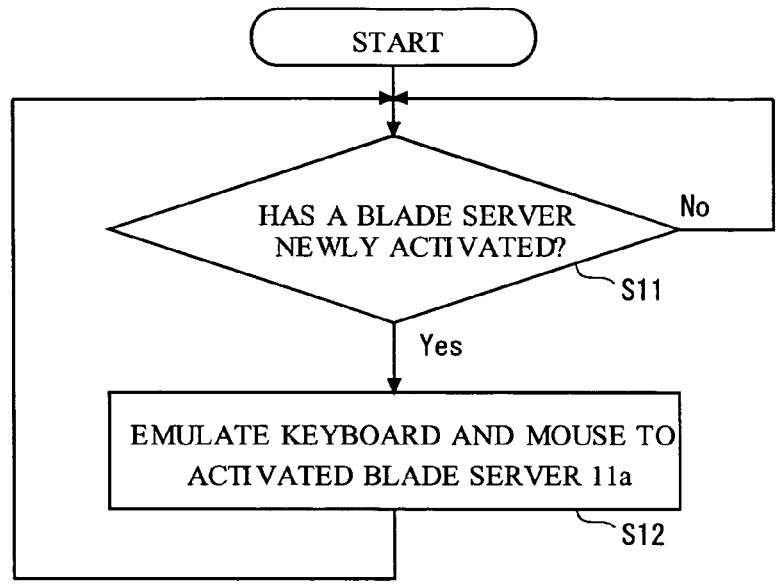
FIG. 4 is a flowchart showing operations when the blade server 11a is newly activated in accordance with the first embodiment of the present invention.
Figure 5:
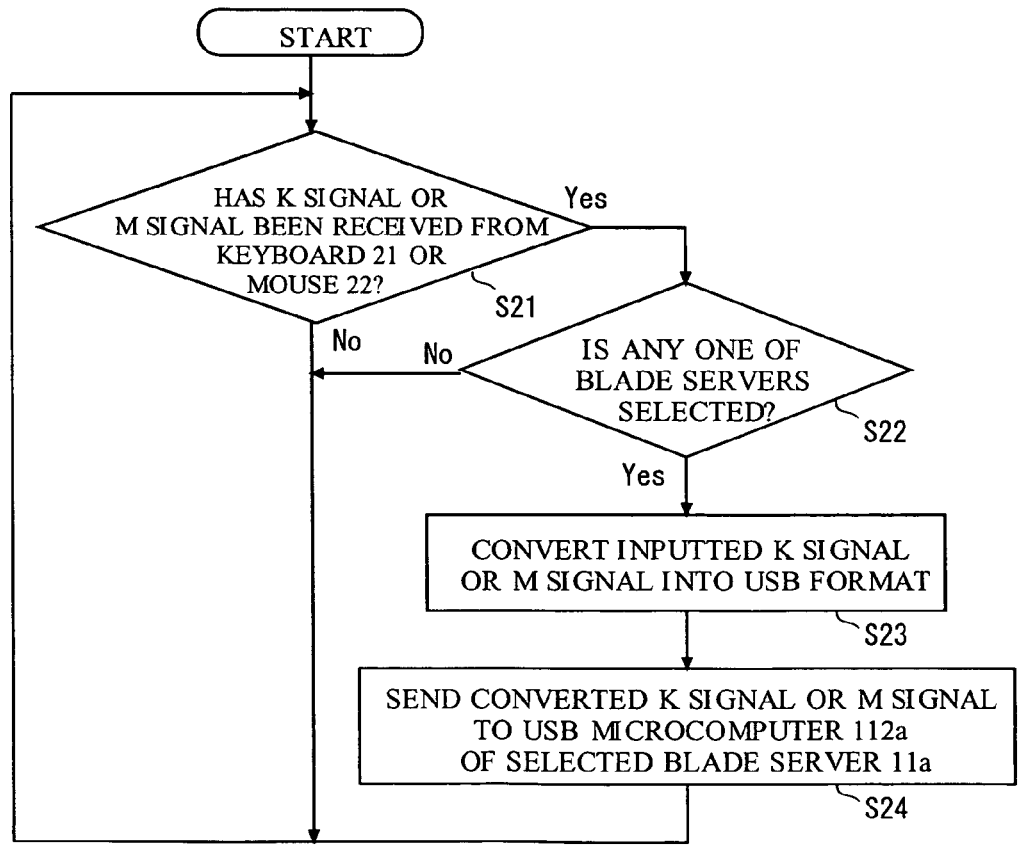
FIG. 5 is a flowchart showing operations when the blade server 11 is operated with the local KVM 20 (1) in accordance with the first embodiment of the present invention.
Figure 6:
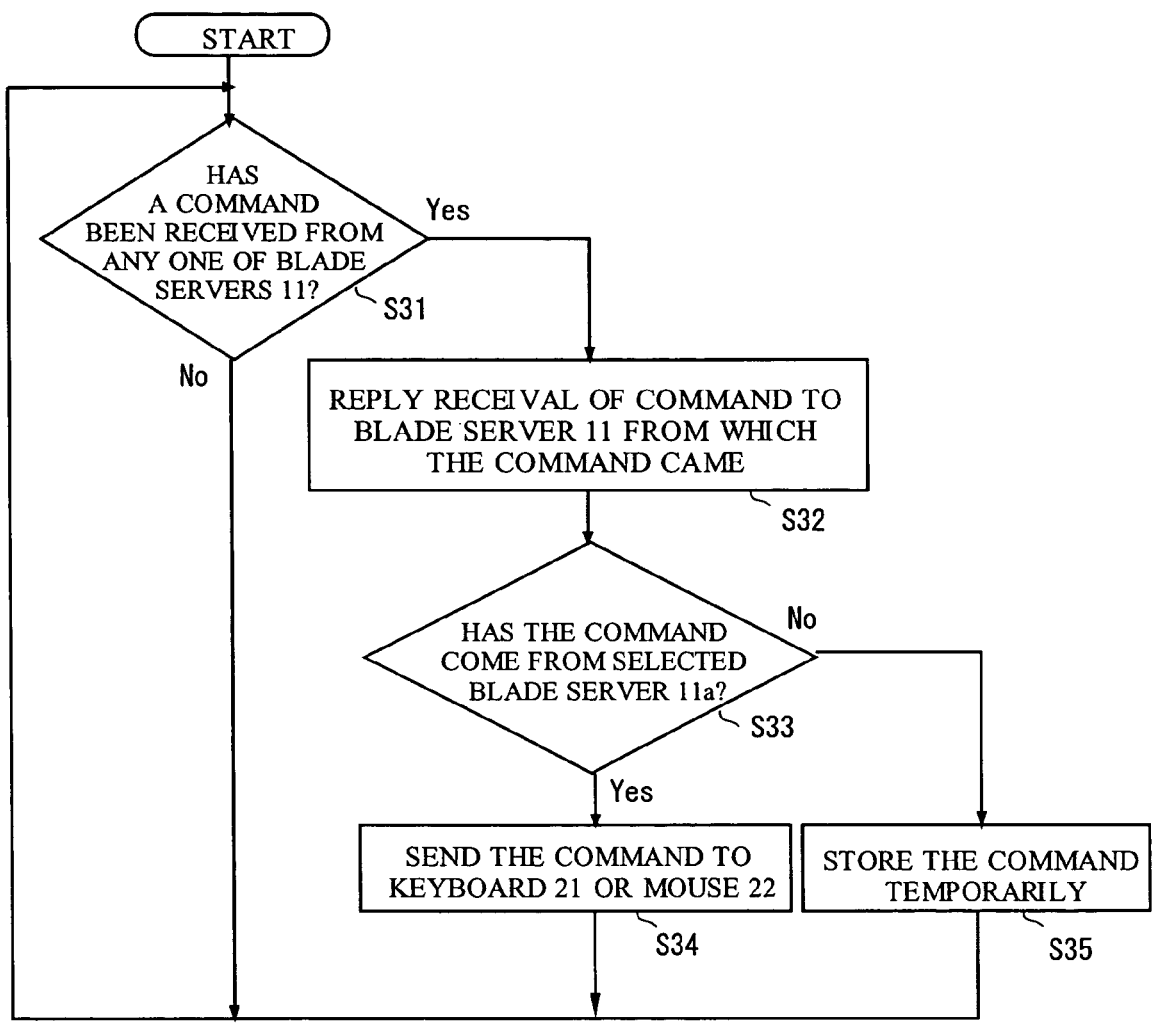
FIG. 6 is a flowchart showing operations when the blade server 11 is operated with the local KVM 20 (2) in accordance with the first embodiment of the present invention.
Figure 7:
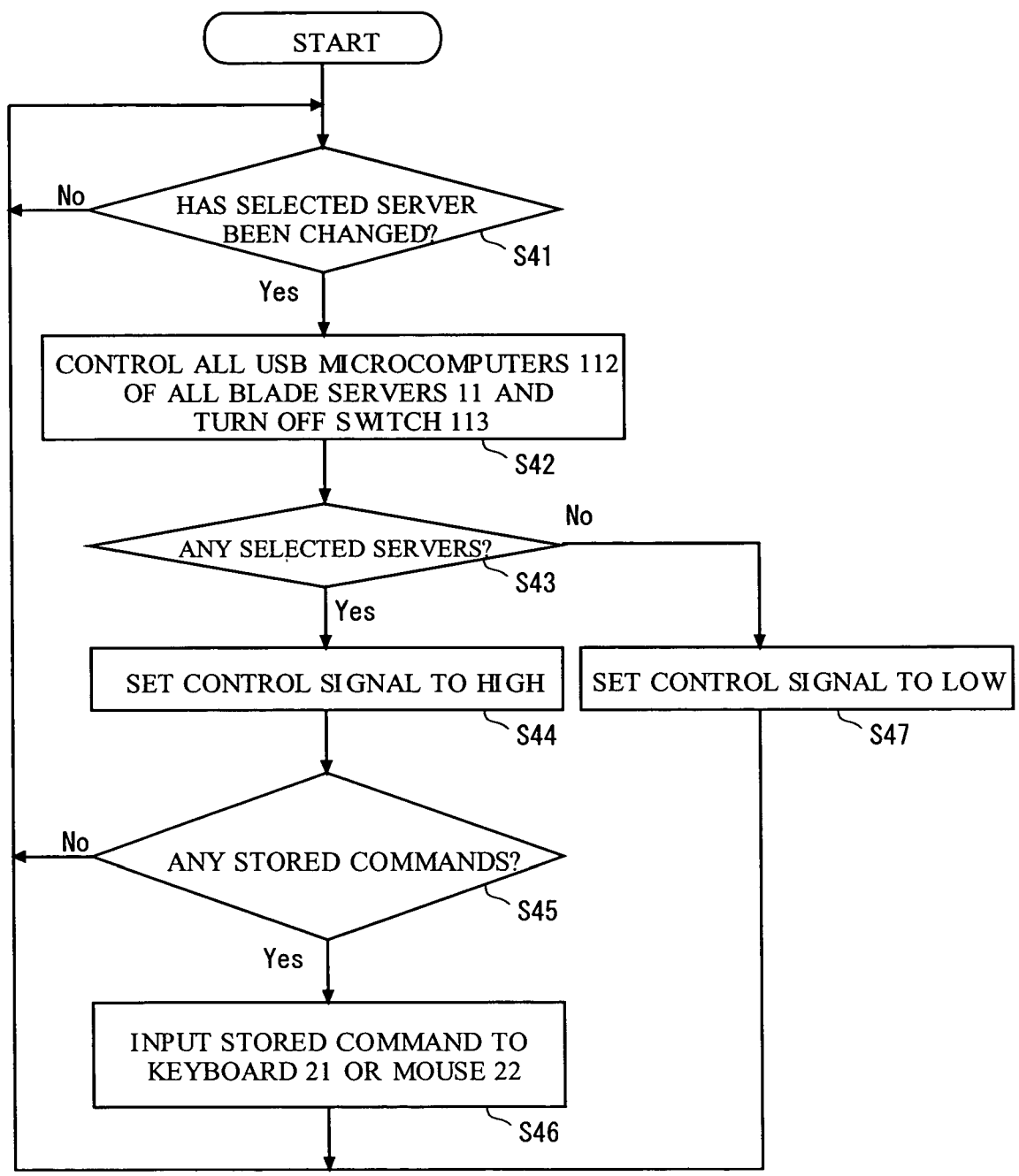
FIG. 7 is a flowchart showing operations when the blade server 11 is operated with the local KVM 20 (3) in accordance with the first embodiment of the present invention.
Figure 8:
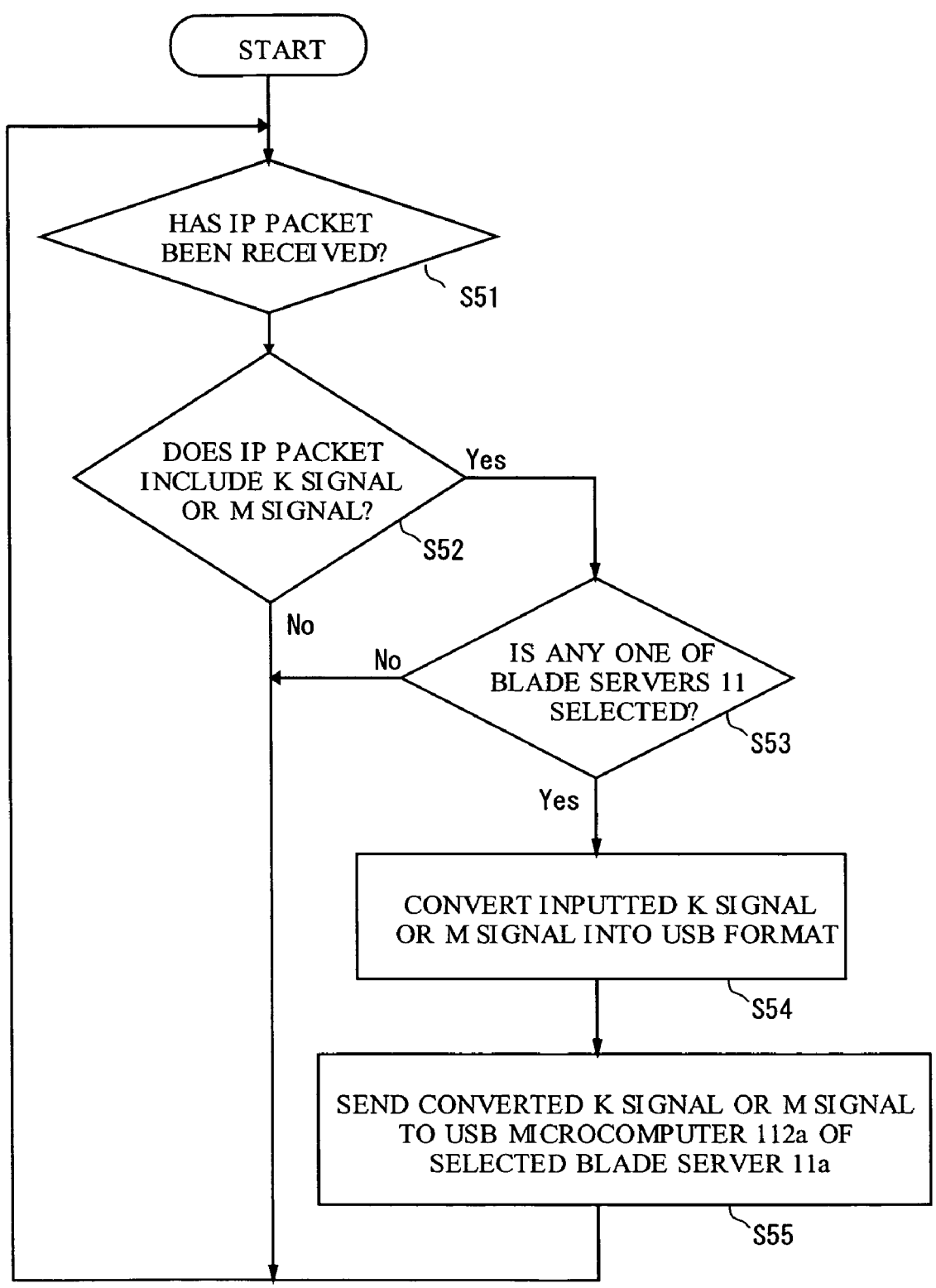
FIG. 8 is a flowchart showing operations when the blade server 11 is operated with the PC 30 (1) in accordance with the first embodiment of the present invention.
Figure 9:
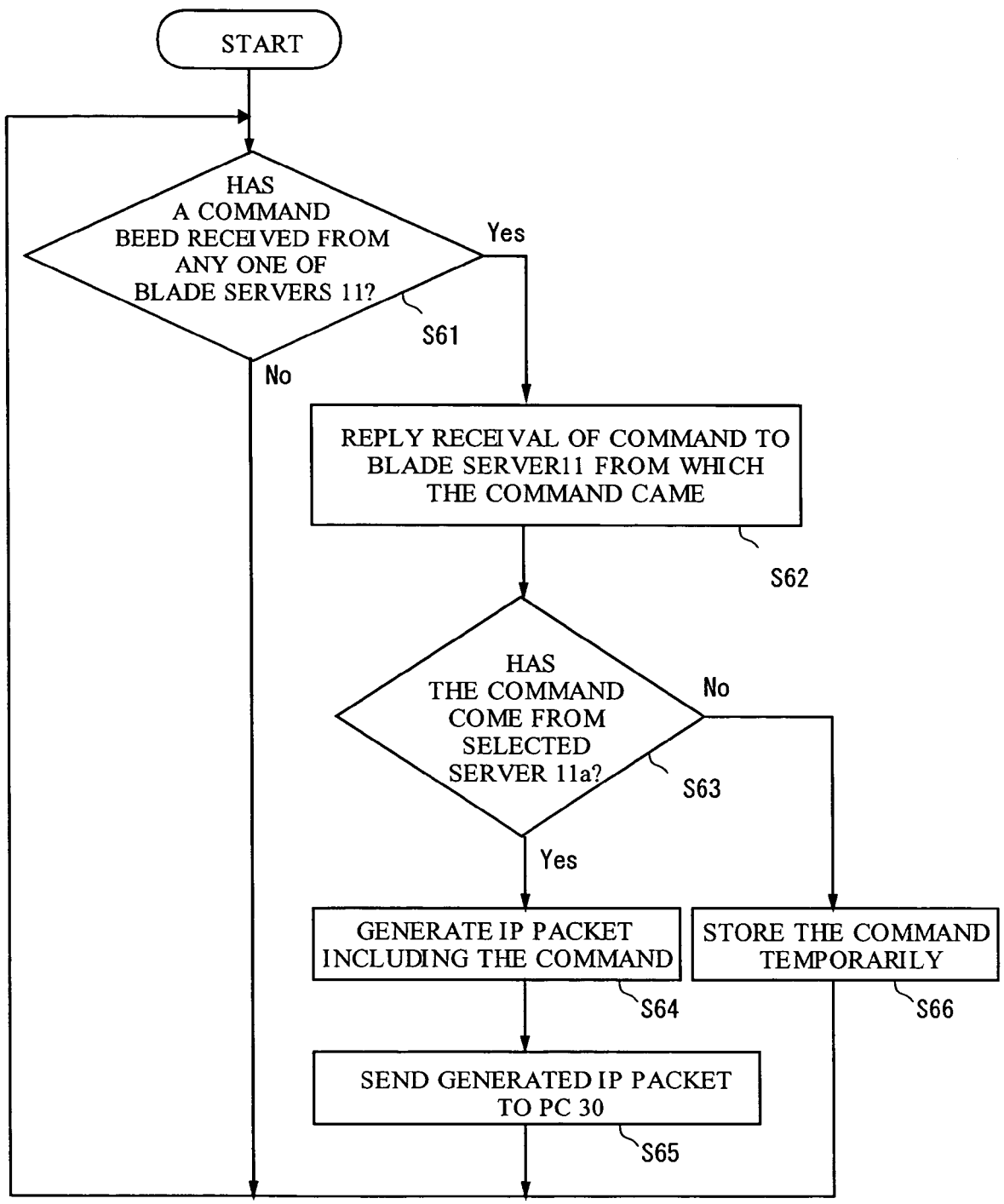
FIG. 9 is a flowchart showing operations when the blade server 11 is operated with the PC 30 (2) in accordance with the first embodiment of the present invention.
Figure 10:
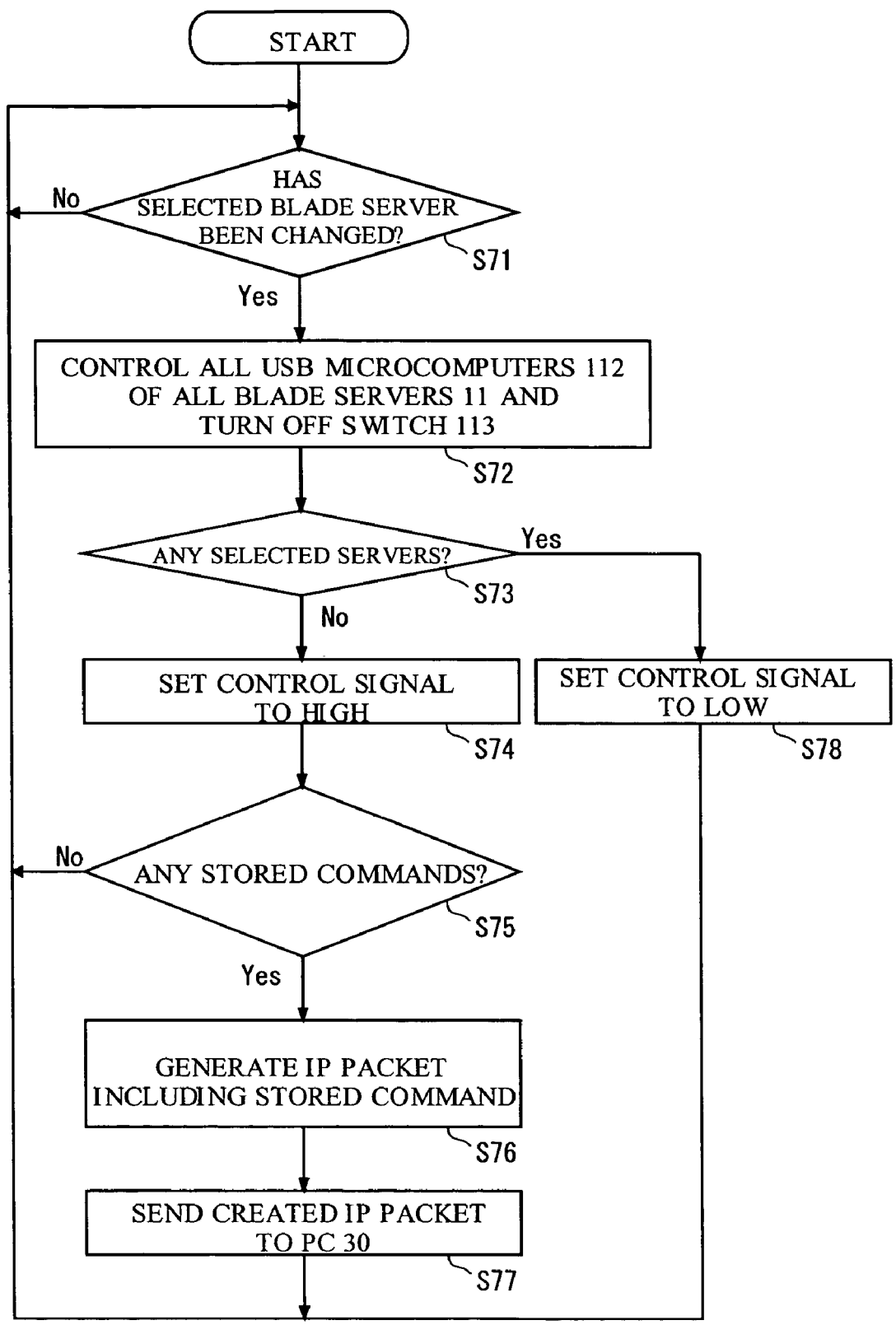
FIG. 10 is a flowchart showing operations when the blade server 11 is operated with the PC 30 (3) in accordance with the first embodiment of the present invention.

FIG. 4 is a flowchart showing an operation when the blade server 11a is newly activated. FIGS. 5 through 7 are flowcharts showing operations when the blade server 11 is operated with the local KVM 20. FIGS. 8 through 10 are flowcharts showing operations when the blade server 11 is operated with the PC 30. The operation of the CPU 121 in the KVM device 12 will be focused in the description below. Also, the blade server 11a is selected in the description below. Reference numerals 11 denotes a general blade server 11, 112 denotes a general USB microcomputer, and 113 denotes a general switch, in the description below.

Referring to FIG. 4, the CPU 121 monitors whether or not any one of the blade servers 11 is newly activated (step S11). This can be determined whether or not a new USB microcomputer 112 has been detected via the interconnection lines 108.

If the blade server 11a is detected as a new blade server 11 (Yes in step S11), the CPU 121 emulates the keyboard and the mouse to the activated blade server 11a (step S12). That is, the CPU 121 recreates the state to show the USB microcomputer 112a as if the keyboard and the mouse were connected. Then, the CPU 121 returns to step S11.

Here, if the blade server 11 is operated with the local KVM 20, the CPU 121 monitors whether the K signal or the M signal is applied from the keyboard or the mouse, as shown in FIG. 5 (step S21). If the K signal or the M signal is applied (Yes in step S21), the CPU 121 determines whether any one of the blade servers 11 is selected (step S22). The CPU 121 manages the selected blade server 11a with a given memory or the like.

In step S22, if any one of the blade servers 11 is not selected (No in step S22), the CPU 121 returns to the step S21. In the above-mentioned case, the CPU 121 drops the applied K signal or M signal. In contrast, if any one of the blade servers is selected (Yes in step S22), the CPU 121 converts the applied K signal or M signal into the USB format (step S23), and sends the USB format to the USB microcomputer 112a of the selected blade server 11a (step S24). Here, the blade server 11a is selected. Then, the CPU 121 returns to step S21. The USB microcomputer 112a inputs the applied K signal or M signal into the K/M signal processing unit 114a. Thus, instructional input information from the keyboard or the mouse is applied to the server structure 111a.

The CPU 121 monitors whether or not the command is applied to the keyboard or the mouse from any one of the blade servers 11 (step S31). If the command is applied from any one of the blade servers 11 (Yes in step S31), the CPU 121 responds to the blade server 11a that the command has been applied in order to notify that the CPU 121 has received the command (step S32). The CPU 121 judges whether or not the command has come from the selected blade server 11a (step S33). This is determined by the information that is managed in the given memory, as described above.

As a result of the decision of the step S33, if the command came from the selected blade server 11a (Yes in step S33), the CPU 121 applies the command to the keyboard 21 or the mouse 22 (step S34), and returns to the step S31. The keyboard 21 or the mouse 22 executes the process such as a change in setting, according to the applied command. In contrast, if the command came from any one of the unselected blade servers 11 (No in step S33), the CPU 121 saves the applied command in a given memory temporarily in association with the unselected blade server 11 (step S35), and returns to the step S31. The command has come from the blade server 11.

Referring to FIG. 7, the CPU 121 monitors whether or not the selected blade server 11 has been changed. Here, a description will be given of the case where the selected blade server 11 has changed from 11a to 11b.

If the selected blade server 11 has been changed (Yes in step S41), the CPU 121 controls all the USB microcomputers 112 of all the blade servers 11, and turns them off (step S42). The control signal to be applied to the OSD processing unit 122 is set to Low (step S42). This prevents the OSD signal from being applied to the monitor 23.

Then, the CPU 121 determines whether or not there is a blade server that is a newly selected one after change (step S43). If there is a selected blade server 11 (Yes in step S43), the control signal is set to High (step S44). This enables to input the OSD signal applied from the OSD processing unit 122 into the monitor 23. If there is not a selected blade server 11 (No in step S43), the CPU 121 sets the control signal to Low (step S47). This interrupts the input signal applied to the monitor 23.

If the selected blade server 11a has been changed to the blade server 11b, the CPU 121 determines whether or not there is the command that has been saved in association with the blade server 11b (step S45). This may be performed by reference to the given memory in the step S35 shown in FIG. 6.

As a result of the step S45, if there is the stored command (Yes in step S45), the CPU 121 applies the command to the keyboard 21 or the mouse 22 (step S46), and returns to the step S41. The keyboard 21 or the mouse 22 performs the process such as a change in setting, based on the applied command. If there is not the stored command (No in step S45), the CPU 121 returns to the step S41.

Thus, it is possible to operate a desired blade server 11 with the local KVM 20.

Referring to FIG. 8, in the case where the blade server 11 is operated with the PC 30, the CPU 121 monitors whether or not the IP packet has been received via the LAN 40 (step S51). If the IP packet has been received (Yes in step S51), the CPU 121 further determines whether or not the IP packet includes the K signal or the M signal (step S52). If the received IP packet includes the K signal or the M signal (Yes in step S52), the CPU 121 determines whether or not any one of the blade servers 11 has been selected (step S53). The CPU 121 controls the selected blade server 11 with the given memory.

As a result of the step S53, if any one of the blade servers is not selected (No in step S53), the CPU 121 returns to the step S51. In the above-mentioned case, the CPU 121 drops the detected K signal or the M signal. If any one of the blade server has been selected (Yes in step S53. The blade server 11a has been selected), the CPU 121 converts the K signal or the M signal into the USB format (step S54), sends the K signal or the M signal in the USB format to the USB microcomputer 112a of the selected blade server 11a (step S55), and then returns to step S51. The USB microcomputer 112a applies the inputted K signal or M signal to the K/M signal processing unit 114a. Thus, the instructional input information of the keyboard or the mouse is given to the server structure 111a.

Referring to FIG. 9, the CPU 121 monitors whether or not the command to the keyboard or the mouse has been applied from any one of the blade servers 11 (step S61). If the command has been applied from any one of the blade servers 11 (Yes in step S61), the CPU 121 replies to the blade server 11 in order to notify that the command has been received (step S62). Also, the CPU 121 determines whether or not the command has come from the blade server 11a that is selected by the command (step S63). This is determined by the information managed by the given memory, as described above.

As a result of step S63, if the command has come from the selected blade server 11a (Yes in step S63), the CPU 121 generates the IP packet including the above-mentioned command (step S64), sends the IP packet to the PC 30 (step S65), and returns to step S61. The PC 30 that has received the IP packet applies the command included in the IP packet to the keyboard or the mouse connected to the PC 30. If the command has been applied from any one of the unselected blade servers 11 (No in step S63), the CPU 121 temporarily stores the applied in the given memory in association with the blade server 11 from which the command has come (step S66), and returns to the step S61.

Referring to FIG. 10, the CPU 121 monitors whether or not the selected blade server has been changed (step S71). Here, a description will be given of the case where the selected blade server has been changed from 11a to 11b.

If the selected blade server has been changed (Yes in step S71), the CPU 121 controls all the USB microcomputers 112 of all the blade servers 11, and turns off the switch 113 (step S72). In the above-mentioned case, the control signal to be applied to the OSD processing unit 122 is set to Low. This prevents the OSD signal from being applied to the monitor 23.

Then, the CPU 121 determines whether or not there is the newly selected blade server (step S73). If there is the newly selected blade server (Yes in step S73), the CPU 121 sets the control signal to High (step S74). Thus, it is possible to input the OSD signal applied from the OSD processing unit 122 into the monitor 23. If there is not the newly selected signal (No in step S78), the CPU 121 sets the control signal to Low (step S78). This prevents the input signal from being applied to the monitor 23.

If the selected blade server 11 has been changed, the CPU 121 determines whether or not there is the stored command in association with the blade server 11b (step S75). This can be performed by reference to the given memory in step S77 in FIG. 9.

As a result of step S75, if there is the stored command (Yes in step S75), the CPU 121 generates the IP packet including the above-mentioned command (step S76), and sends the IP packet to the PC 30 (step S77). The PC 30 that has received the IP packet applies the command included in the IP packet to the keyboard or the mouse connected to the PC 30. If there is not the stored command (No in step S75), the CPU 121 returns to step S71.

Thus, it is possible to operate a desired blade server 11 with the PC 30.

As described above, the first embodiment includes the architecture that the KVM device 12 and the blade server 11 are connected by the interface that enables the plug and play. Thus, when the blade server 11a is inserted or removed, it is no longer necessary to power off any one of the blade servers 11, the KVM device 12, or the blade chassis 10. In addition, with the above-mentioned architecture, it is readily connect the CPU 121 and the USB microcomputer 112a. Further, it is possible to change the selected blade server immediately. In addition to the above-mentioned technical merits, the KVM device 12 has a chassis structure same as those of the blade servers 11 in accordance with the first embodiment of the present invention. This makes it possible to reduce the number of external cables to connect the KVM device 12 and the blade servers 11 respectively, and also makes it possible to facilitate the system construction and management largely.

Second Embodiment

Next, a description will now be given of a second embodiment of the present invention, with reference to the accompanying drawings. Hereinafter, in the second embodiment, the same components and configurations as those of the first embodiment have the same reference numerals and a detailed explanation will be omitted, if not otherwise specified.

Figure 11:
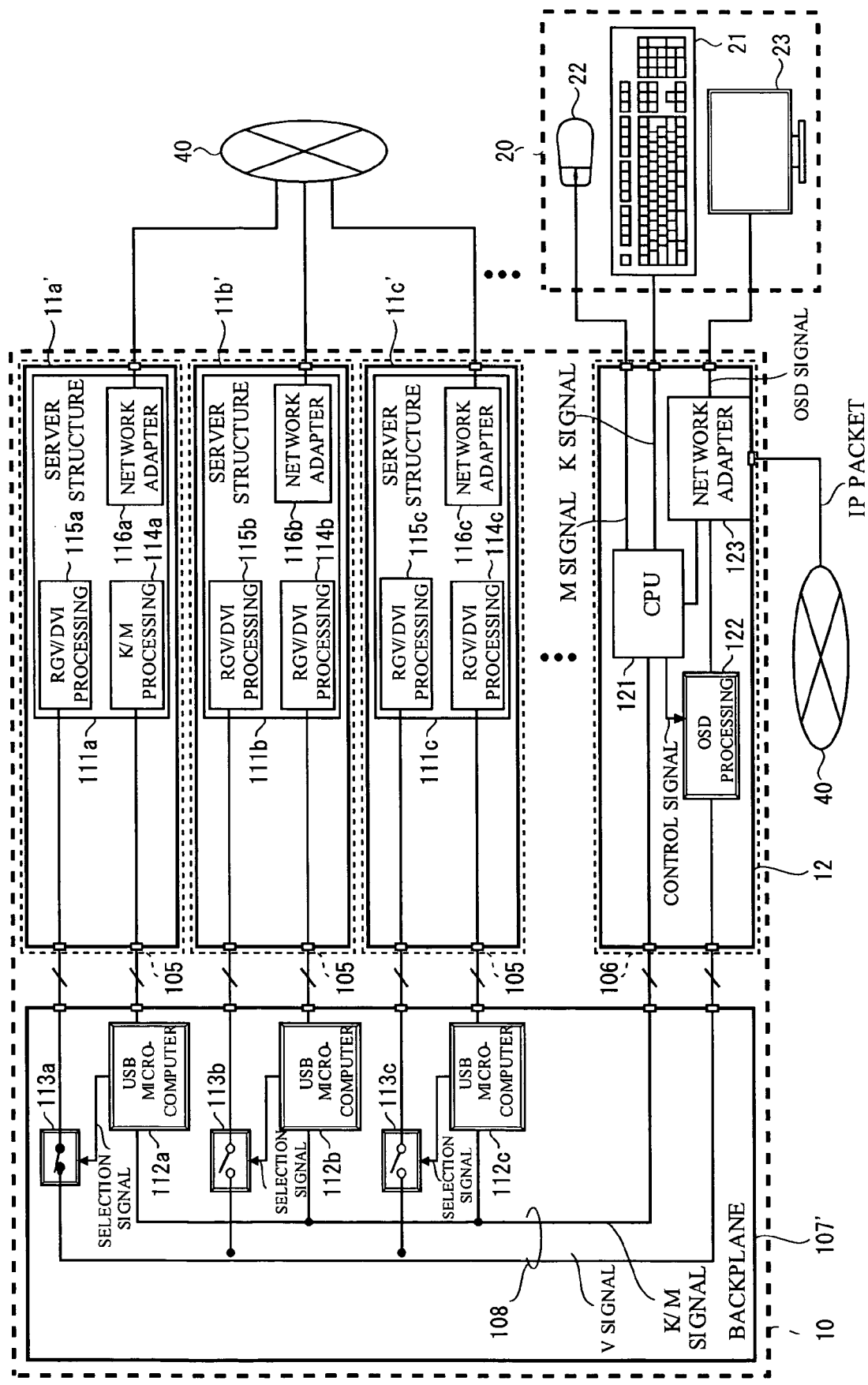
FIG. 11 is a block diagram showing architecture of a blade chassis 10, a blade servers 11a', 11b', and 11c', and a KVM device 12, in accordance with a second embodiment of the present invention.

FIG. 11 is a block diagram showing a blade chassis 10, a blade servers 11a', 11b', and 11c', and a KVM device 12, in accordance with the second embodiment of the present invention. It is to be noted that the present invention is not limited to the three blade servers 11a', 11b', and 11c'.

Referring to FIG. 11, USB microcomputers 112a, 112b, and 112c and switches 113a, 113b, and 113c are mounted on a backplane 107' of a blade chassis 10, in accordance with the second embodiment of the present invention. In contrast, the USB microcomputers 112a, 112b, and 112c and the switches 113a, 113b, and 113c are respectively mounted on the blade servers 11a, 11b, and 11c, in accordance with the first embodiment of the present invention.

With the above-mentioned architecture, it is possible to reduce the circuits that should be mounted on the respective blade servers 11a', 11b', and 11c', and it is thus possible to construct respective blade servers 11a', 11b', and 11c' at a relatively low cost. Other components and operation of the above-mentioned architecture in accordance with the second embodiment of the present invention correspond to those in accordance with the first embodiment of the present invention. Therefore, a detailed explanation is omitted here.

Third Embodiment

Next, a description will be given of a third embodiment of the present invention, with reference to the accompanying drawings. Hereinafter, in the third embodiment, the same components and configurations as those of the first and second embodiments have the same reference numerals and a detailed explanation will be omitted, if not otherwise specified.

Figure 12:
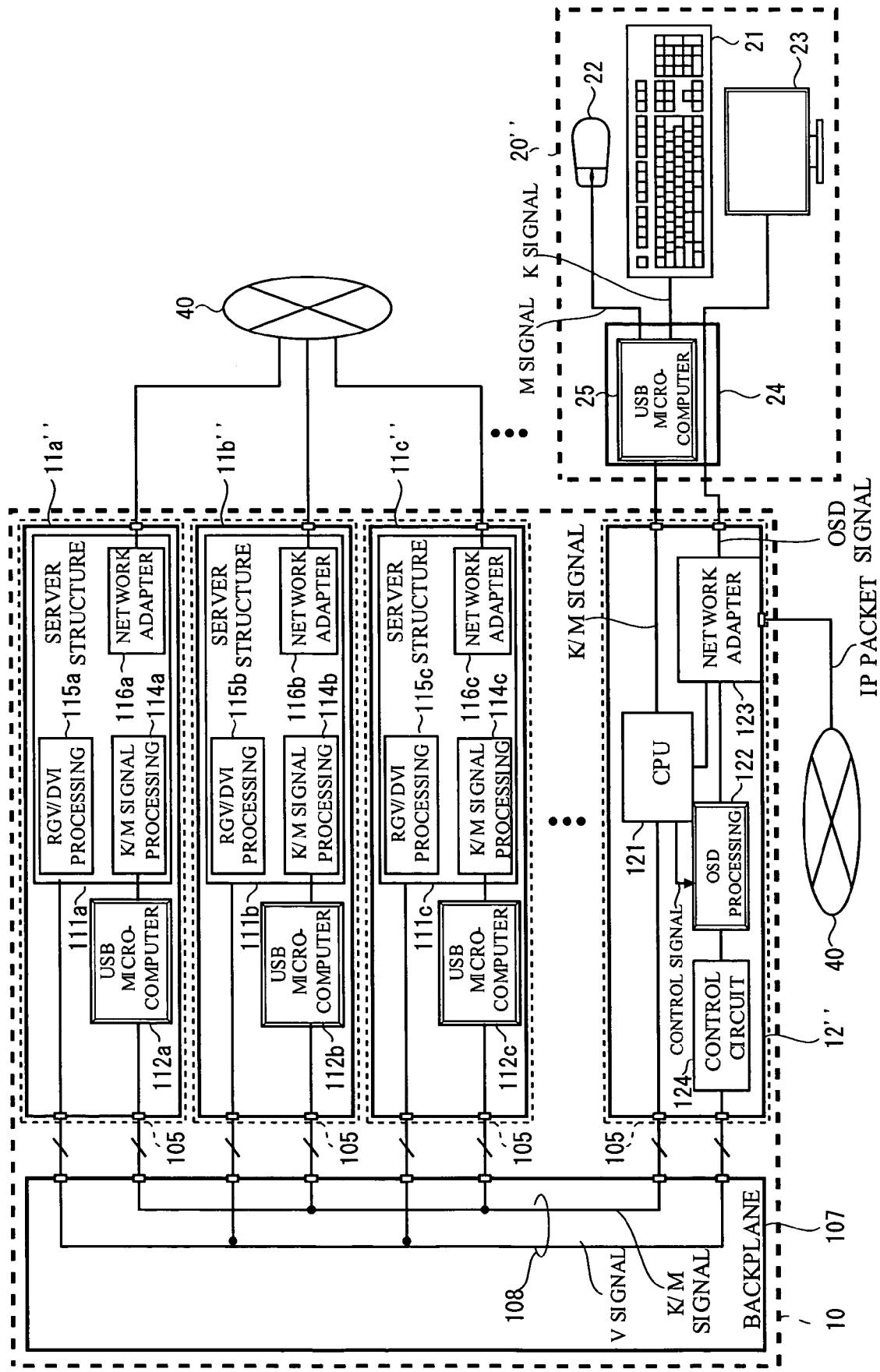
FIG. 12 is a block diagram showing architecture of a blade chassis 10, a blade servers 11a", 11b", and 11c", and a KVM device 12", in accordance with the third embodiment of the present invention.

FIG. 12 is a block diagram showing a blade chassis 10, a blade servers 11a", 11b", and 11c", and a KVM device 12", in accordance with the third embodiment of the present invention. It is to be noted that the present invention is not limited to the three blade servers 11a", 11b", and 11c".

Referring to FIG. 12, the blade servers 11a", 11b", and 11c" do not include the switch 113a, 113b, or 113c, as compared to the first embodiment of the present invention. Instead, the KVM device 12" is equipped with a control unit 124.

The control unit 124 is configured to selectively pass the V signal applied from the blade servers 11a", 11b", and 11c". In other words, the control unit 124 passes only the V signal applied from a certain blade server 11 to the OSD processing unit 122. It is to be noted that the user selects the above-mentioned certain blade server 11. Therefore, the control unit 124 applies only the V signal to the OSD processing unit 122, based on the control of the CPU 121. Here, the blade server 11a" is selected. The operation of the OSD processing unit 122 that the V signal has been applied is the same as that of the OSD processing unit 122 in accordance with the first embodiment of the present invention.

A local KVM device 20" includes a signal processing unit 24 in accordance with the third embodiment of the present invention. The signal processing unit 24 relays or processes the K/M signal and the OSD signal applied from the KVM device 12". The signal processing unit 24 includes a USB microcomputer 25. The K/M signal is applied to the USB microcomputer 25 from the keyboard 21 or the mouse 22. The USB microcomputer 25 inputs the applied K/M signal into the CPU 121. The USB microcomputer 25 may be connected to the CPU 121 with the USB. Also, the keyboard and the mouse may be connected to the USB microcomputer 25 via the USB or another interface such as PS/2.

With the above-mentioned architecture, the circuits respectively mounted on the blade servers 11a", 11b", and 11c" may be omitted, and thus it is possible to construct the respective blade servers 11a", 11b", and 11c" at a low cost. Other components and operation of the above-mentioned architecture in accordance with the third embodiment correspond to those in accordance with the first embodiment of the present invention. Therefore, a detailed explanation will be omitted here.

Fourth Embodiment

Next, a description will be given of a fourth embodiment of the present invention, with reference to the accompanying drawings. Hereinafter, in the fourth embodiment, the same components and configurations as those of the first through third embodiments have the same reference numerals and a detailed explanation will be omitted, if not otherwise specified.

Figure 13:
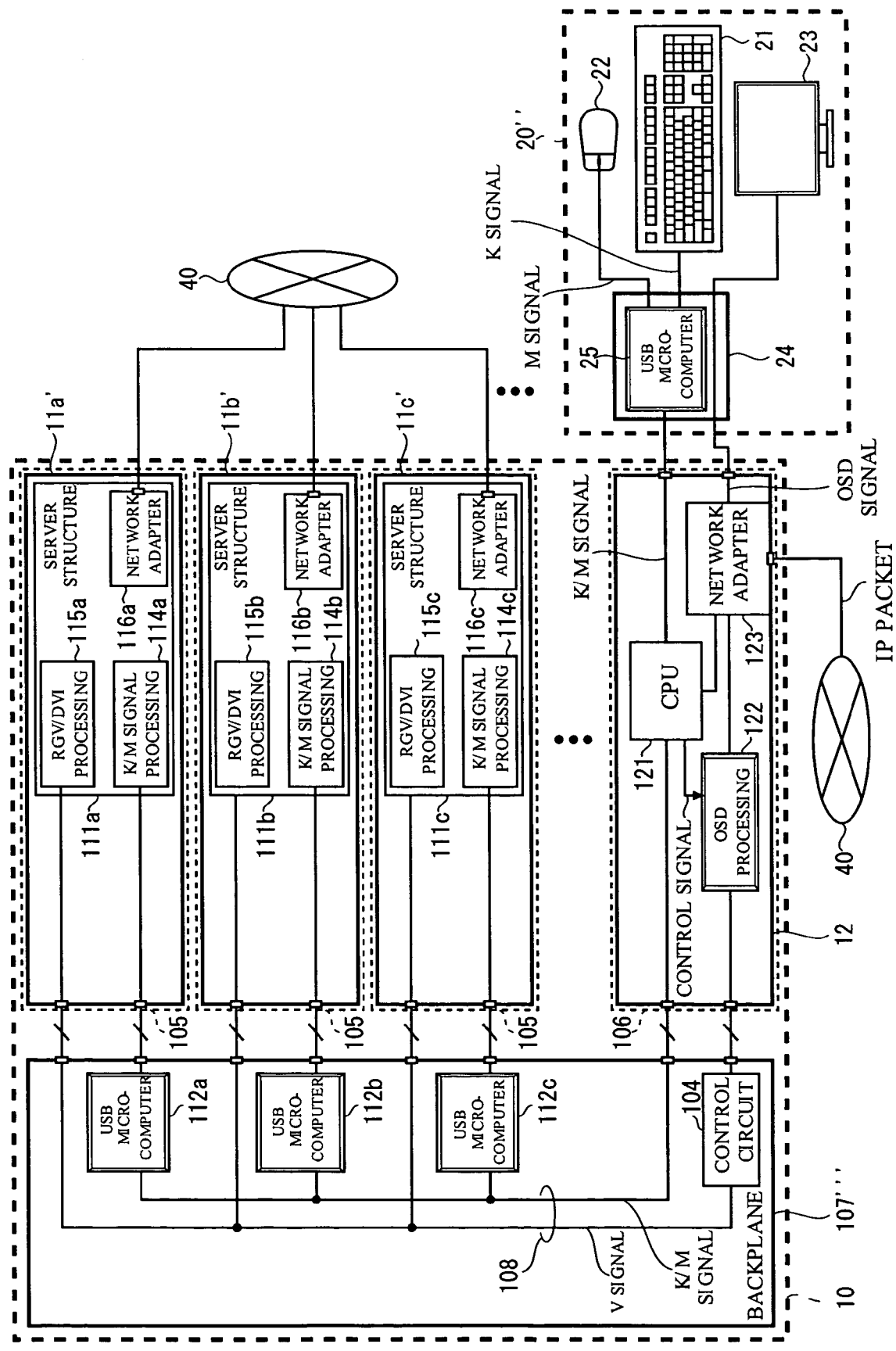
FIG. 13 is a block diagram showing architecture of a blade chassis 10, blade servers 11a', 11b', and 11c', and a KVM device 12, in accordance with a fourth embodiment of the present invention.

FIG. 13 is a block diagram showing a blade chassis 10, blade servers 11a', 11b', and 11c', and a KVM device 12, in accordance with the fourth embodiment of the present invention. It is to be noted that the present invention is not limited to the three blade servers 11a', 11b', and 11c'.

Referring to FIG. 13, USB microcomputers 112a, 112b, and 112c are mounted on a backplane 107''' of a blade chassis 10, in accordance with fourth embodiment of the present invention. In contrast, the USB microcomputers 112a, 112b, and 112c are mounted on the blade servers 11a", 11b", and 11c", in accordance with the third embodiment of the present invention.

With the above-mentioned architecture, the number of circuits respectively mounted on the blade servers 11a', 11b', and 11c' may be reduced, and thus it is possible to construct the respective blade servers 11a', 11b', and 11c' at a relatively low cost. Other components and operation of the above-mentioned architecture in accordance with the fourth embodiment of the present invention correspond to those in accordance with the first embodiment of the present invention. Therefore, a detailed explanation is omitted here.

Fifth Embodiment

Next, a description will be given of a fifth embodiment of the present invention, with reference to the accompanying drawings. Hereinafter, in the fifth embodiment, the same components and configurations as those of the first through fourth embodiments have the same reference numerals and a detailed explanation will be omitted, if not otherwise specified.

Figure 14:
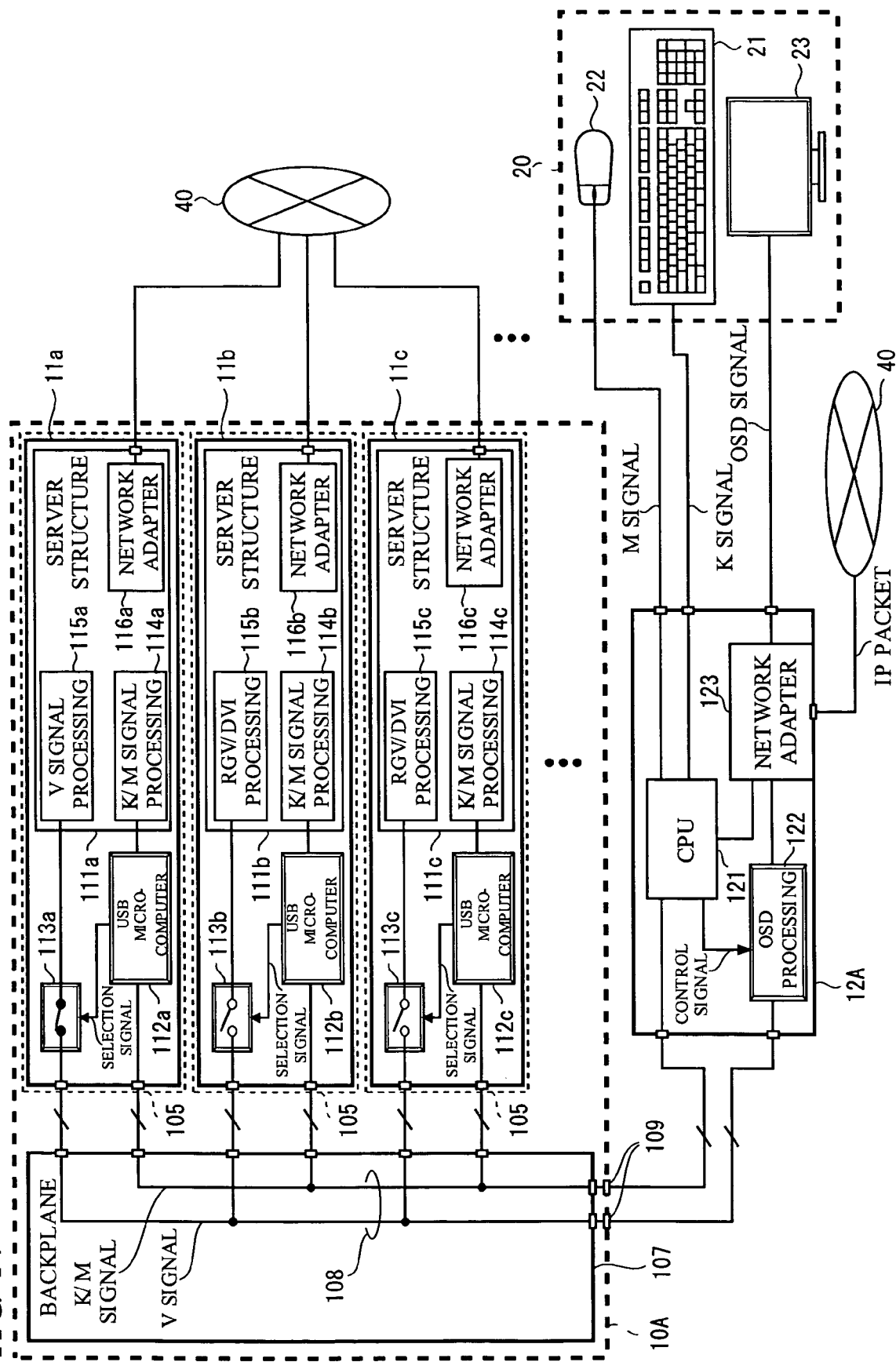
FIG. 14 is a block diagram showing architecture of a blade chassis 10A, blade servers 11a, 11b, and 11c, and a KVM device 12A in accordance with a fifth embodiment of the present invention.

FIG. 14 is a block diagram showing a blade chassis 10A, blade servers 11a, 11b, and 11c, and a KVM device 12A. It is to be noted that the present invention is not limited to the three blade servers 11a, 11b, and 11c.

Referring to FIG. 14, the KVM device 12 is not included in the blade chassis 10A, in accordance with the fifth embodiment of the present invention, although the KVM device 12 is mounted on the blade chassis 10, in accordance with the first embodiment of the present invention. The KVM device 12A is connected to interconnection lines 108 in the blade chassis 10A via an external terminal 109 provided on the surface of the blade chassis 10A. The structure and operation of the KVM device 12A is same as those of the KVM device 12.

With the above-mentioned architecture, it is possible to prevent the blade chassis 10 from getting bigger, and it is also possible to prevent the number of the blade servers 11 from decreasing. Other components and operation of the above-mentioned architecture in accordance with the fifth embodiment of the present invention correspond to those in accordance with the first embodiment of the present invention. Therefore, a detailed explanation is omitted here.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-385198 filed on Nov. 14, 2003 including specification, claims, drawings, and abstract is incorporated herein by reference in its entirety.

What is claimed is:

1. A server system comprising:
   at least one server;
   a signal processing unit that connects a set of consoles including a keyboard, a video monitor and a mouse to said at least one server and enables said at least one server to be operated with the set of consoles; and
   a chassis having slots and a circuit board having interconnection lines connecting the slots, the interconnection lines including a first line for transporting keyboard and/or mouse signals and a second line for transporting video signals from/to said at least one server, said at least one server and the signal processing unit being inserted into any of the slots so as to be mutually connected via the interconnection lines,
   said at least one server and the signal processing unit being connected via an interface that allows plug and play connectivity so that another server can be switched to, connected to and disconnected from the server system without powering off the at least one server in an on state and the signal processing unit,
   wherein the signal processing unit sends the keyboard and/or mouse signals received from the keyboard and/or mouse to a selected one of said at least one server through the first line, and sends a command received from the selected one of said at least one server through the first line to the keyboard and/or mouse.

2. A signal processing unit comprising:
   a first circuit having an interface that allows plug and play connectivity; and
   a second circuit connectable to a server system via the first circuit, the server system having a chassis that has slots and interconnection lines connecting the slots, at least one server being able to be inserted into any of the slots so as to be connected to the interconnection lines, the interconnection lines including a first line for transporting keyboard and/or mouse signals and a second line for transporting video signals from/to said at least one server,
   the signal processing unit being connectable to any of the slots and connecting a set of consoles including a keyboard, a video monitor and a mouse to said at least one server via the first and second circuits,
   wherein the plug and play connectivity is sufficient so that another server can be switched to, connected to and disconnected from the server system without powering off the server in an on state, and
   wherein the signal processing unit sends the keyboard and/or mouse signals received from the keyboard and/or mouse to a selected one of said at least one server through the first line, and sends a command received from the selected one of said at least one server through the first line to the keyboard and/or mouse.

3. The signal processing unit as claimed in claim 2, wherein the signal processing unit is able to be inserted into any one of the slots of the server system so as to be connected to the server via the interconnection lines.

4. The signal processing unit as claimed in claim 2, comprising a control circuit that passes only video signals applied from any one of the servers inserted into the slots.

5. The signal processing unit as claimed in claim 2, comprising a network adapter that sends and receives packets to and from a client terminal via a network,
   the servers inserted into the slots being operated with the set of console provided in the client terminal.

6. A server comprising:
   a connector that allows the server to be inserted into any of slots that are provided to a chassis of a server system, the chassis having interconnection lines connecting the slots, the interconnection lines including a first line for transporting keyboard and/or mouse signals and a second line for transporting video signals from/to said server, the server being able to be inserted into said any of the slots so that the connector is connected to the interconnection lines; and
   an interface circuit connected to a signal processing unit that is inserted into one of the slots so as to be connected to the server via the interconnection lines, and has an interface that allows the server to be connected to the signal processing unit with plug and play connectivity so that another server can be switched to, connected to and disconnected from the server system without powering off the server in an on state and the signal processing unit,
   the signal processing unit connecting a set of consoles including a keyboard, a video monitor and a mouse to the server and enables the server to be operated with the set of consoles,
   wherein the signal processing unit sends the keyboard and/or mouse signals received from the keyboard and/or mouse to said server through the first line, and sends a command received from the server through the first line to the keyboard and/or mouse.

7. The server as claimed in claim 6, further comprising a microcomputer that controls the interface.

8. The server as claimed in claim 6, further comprising a switch that enables or disables an output of video signals.

9. A chassis, comprising:
   a circuit board having slots into which servers and a signal processing unit can be inserted; and
   interconnection lines that are provided to the circuit board and connects the slots, the interconnection lines including a first line for transporting keyboard and/or mouse signals and a second line for transporting video signals from/to said at least one server, and the servers and the signal processing unit being inserted into slots so as to be mutually connected via the interconnection lines,
   the servers being connected, via the interconnection lines, to a signal processing unit having an interface that selectively connects a set of consoles including a keyboard, video monitor and a mouse to any of the servers and enables operate any of the servers to be operated with a single set of consoles so that another server can be switched to, connected to and disconnected from the chassis without powering off the servers in an on state and the signal processing unit, wherein the signal processing unit sends the keyboard and/or mouse signals received from the keyboard and/or mouse to a selected one of said at least one server through the first line, and sends a command received from the selected one of said at least one server through the first line to the keyboard and/or mouse.

10. The chassis as claimed in claim 9, wherein the slots can accommodate the signal processing unit.

11. The chassis as claimed in claim 9, further comprising an external terminal that connects the signal processing unit to the interconnection lines.

12. The chassis as claimed in claim 9, further comprising a microcomputer that controls an interface that has plug and play connectivity.

13. The chassis as claimed in claim 9, further comprising switches that are provided to slots and enable or disable video signals applied from the servers.

14. The chassis as claimed in claim 9, wherein the circuit board includes a control circuit that passes only a video signal applied from any one of the servers.

15. The server system as claimed in claim 1, wherein the signal processing unit stores a command received from another of said at least one server, and sends the command received from another of said at least one server through the first line, to the keyboard and/or mouse in the case of changing the selected one of said at least one server to said another of said at least one server.

16. The signal processing unit as claimed in claim 2, wherein the signal processing unit stores a command received from another of said at least one server, and sends the command received from said another of said at least one server, through the first line, to the keyboard and/or mouse, in the case of changing the selected one of said at least one server to said another of said at least one server.

17. The server as claimed in claim 6, wherein the signal processing unit stores a command received from another server, and sends the command received from said another server, through the first line, to the keyboard and/or mouse, in the case of changing the server to said another server.

18. The chassis as claimed in claim 2, wherein the signal processing unit stores a command received from another of the servers, and sends the command received from said another of the servers, through the first line, to the keyboard and/or mouse, in the case of changing a selected server to said another of the servers.

* * * * *